(12) United States Patent
Rehfuss et al.

(10) Patent No.: US 12,728,782 B2
(45) Date of Patent: Sep. 8, 2026

(54) MOTOR VEHICLE SEAT AND MOTOR VEHICLE HAVING SUCH A MOTOR VEHICLE SEAT

(71) Applicant: Dr. Ing. h.c. F. Porsche Aktiengesellschaft, Stuttgart (DE)

(72) Inventors: Benjamin Rehfuss, Rutesheim (DE); Max Nitsch, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 239 days.

(21) Appl. No.: 18/227,793

(22) Filed: Jul. 28, 2023

(65) Prior Publication Data

US 2024/0034212 A1 Feb. 1, 2024

(30) Foreign Application Priority Data

Aug. 1, 2022 (DE) ..................... 10 2022 119 184.2

(51) Int. Cl.
*B60N 2/879* (2018.01)
*B60N 2/58* (2006.01)

(52) U.S. Cl.
CPC ........... *B60N 2/879* (2018.02); *B60N 2/5825* (2013.01)

(58) Field of Classification Search
CPC .............................. B60N 2/879; B60N 2/5825
See application file for complete search history.

(56) References Cited

U.S. PATENT DOCUMENTS

| | | | | |
|---|---|---|---|---|
| 4,217,628 A * | 8/1980 | Windom | G09F 13/04 | 439/13 |
| 5,658,046 A * | 8/1997 | Rus | B60N 2/36 | 296/65.09 |
| 6,612,648 B1 * | 9/2003 | Hashiguchi | B60N 2/5825 | 297/218.1 |
| 7,891,735 B2 | 2/2011 | Oku | | |
| 8,556,319 B2 * | 10/2013 | Petouhoff | B60N 2/58 | 296/1.08 |
| 10,207,608 B2 | 2/2019 | Yamakawa | | |
| 10,974,644 B2 * | 4/2021 | Severinski | B60Q 3/60 | |

FOREIGN PATENT DOCUMENTS

| | | |
|---|---|---|
| CN | 101428574 A | 5/2009 |
| CN | 106794979 A | 5/2017 |
| CN | 107031498 A | 8/2017 |
| DE | 202012103295 | 11/2012 |
| DE | 102015008158 | 12/2016 |
| DE | 102020115715 | 12/2021 |
| JP | 2021023475 A | 2/2021 |

* cited by examiner

*Primary Examiner* — Timothy J Brindley
*Assistant Examiner* — Jessica Kathryn Thompson
(74) *Attorney, Agent, or Firm* — LEYDIG, VOIT & MAYER, LTD.

(57) ABSTRACT

A motor vehicle seat (1) having an illuminable screen (2) and a cover (3). Several hooks (7) are sewn onto an edge of the cover (3). The hooks (7) enable the cover (3) to be suspended on a headrest support (5) of the motor vehicle seat (1) to enable a reliable and visually appealing fixation of the cover (3).

4 Claims, 2 Drawing Sheets

MOTOR VEHICLE SEAT AND MOTOR VEHICLE HAVING SUCH A MOTOR VEHICLE SEAT

CROSS REFERENCE TO RELATED APPLICATION

This application claims priority on German Patent Application No 10 2022 119 184.2 filed Aug. 1, 2022, the entire disclosure of which is incorporated herein by reference.

BACKGROUND

Field of the Invention

The invention relates to a motor vehicle seat having an illuminable screen and a cover. The invention further relates to a motor vehicle having such a motor vehicle seat.

Related Art

U.S. Pat. No. 8,556,319 B2 discloses a motor vehicle seat with an illuminable screen and a cover. The cover has a surface that can also be illuminated from the rear. The surface is treated with a laser so that a graphical element or pattern is introduced.

U.S. Pat. No. 10,974,644 B2 discloses a vehicle seat with a graphical component and a light source that illuminates the graphical component.

DE 10 2020 115 715 A1 discloses a vehicle seat with a cushion body and a cover that has openings. An illumination device is arranged in the vehicle seat, and a side of the cover facing the illumination device can be exposed with light.

DE 10 2015 008 158 A1 discloses an illumination device for generating a suspended illuminated display as staging in a vehicle with an optical element that is illuminated by a light source. The optical element can be configured as a fiber optic having a microstructure display that is invisible in a unlit state of the fiber optic.

DE 20 2012 103 295 U1 discloses a driver or passenger seat of a trailer, camper van, or the like with a back part. An illuminated display device is provided on the front side of the back part and is intended to reproduce a name or logo.

Technical refinements of motor vehicles currently include visual highlights that are intended to improve the overall impression of the motor vehicle and thereby increase its value. Illuminated or rear-illuminated elements/screens are of particular importance to create a particularly comfortable and even customizable atmosphere. Rear-illuminated elements in motor vehicle seats should create a high-quality visual impression. For this purpose, a cover may be fixed to surround the rear-illuminated element or screen tightly and cleanly in the region of the rear-illuminated element or screen.

One object of the invention is to provide a motor vehicle seat with an improved fixation of a cover in the region of a screen.

SUMMARY OF THE INVENTION

One aspect of invention relates to a motor vehicle seat having a cover with an edge that is fixed adjacent an illuminable screen. For this purpose, the cover has hooks that reliably and tightly engage a fixed component. The fixed element of one embodiment is a headrest support of the motor vehicle seat. The hooks enable an extremely appealing visual transition between the cover of the motor vehicle seat and the screen. Several hooks may be sewn onto the edge of the cover to enable an extremely simple fixing of the cover on the motor vehicle seat by suspending the hook elements in the headrest support. This arrangement provides the extremely visually appealing enclosure of an edge of a mounting window for the screen and also enables a visually high-quality transition between the cover and the illuminable screen.

The screen may be arranged in a mounting window of the headrest support. Additionally, the illuminable screen may be located below the actual headrest and on an upper part of a backrest of the motor vehicle seat. This region of the motor vehicle seat normally has no body contact with a vehicle occupant. An illuminable screen in this region is very visible from the outside, and thus can facilitate locating the motor vehicle in the dark and also is immediately in a field of view when a driver approaches or opens the motor vehicle.

The headrest support can be formed from plastic and may have a top edge and a bottom edge on the mounting window. The cover is connected to the top edge and the bottom edge via the hooks, and in particular encompasses the hooks. This allows for a comparatively simple mounting or fixation of the cover via its hooks on the headrest support of the motor vehicle seat, and the fixation can be accomplished easily by even inexperienced workers. The hooks can be formed from plastic.

In some embodiments, first, second and third hooks are sewn to the edge of the cover. The first hook rearwardly engages the upper edge of the mounting window, while the second and third hooks rearwardly engage the lower edge of the mounting window. This enables a highly reliable and tight fixation of the cover in the region of the mounting window and thus in the transition region from the headrest support to the screen, which subsequently is inserted into the mounting window.

The edge of the cover may be bent, i.e. doubled, in the region of the sewn-on hooks. This makes it possible to introduce significantly higher tensile forces in the cover without having to fear that the cover will tear.

The installed illuminable screen obscures the hooks. Thus, the hooks required for fixation of the cover to the lower and upper edges of the mounting window of the headrest support are not visible when the vehicle seat is mounted, thereby providing a particularly appealing visual appearance. However, the hooks easily can be can be accessed to remove the illuminable screen or to change the cover.

The invention also relates to the general concept of equipping a motor vehicle with a motor vehicle seat as described in the previous paragraphs, thereby transferring the advantages described in relation to the motor vehicle seat to the motor vehicle. Specifically, the advantages lie in that an optically extremely appealing transition is possible between a cover in the region of a mounting window for an illuminable screen.

Further features and advantages of the invention follow from the claims, the drawings, and the accompanying description of the illustrated embodiments. The features mentioned above and discussed below can be used in the specified combinations, in other combinations or on their own without departing from the scope of the invention. Identical reference numbers used in the drawings refer to identical, similar, or functionally identical components.

DETAILED DESCRIPTION

Figure 1:
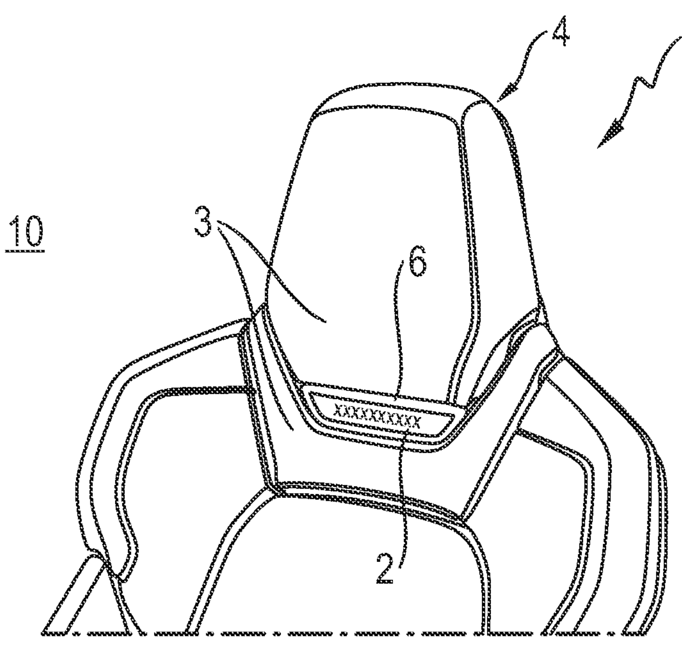
FIG. 1 is a top plan view of a motor vehicle seat according to the invention.
Figure 2:
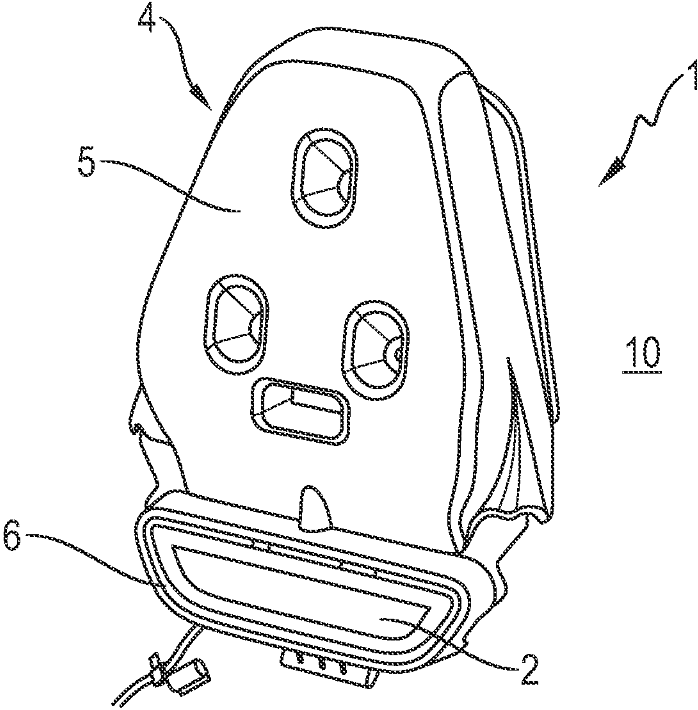
FIG. 2 is a detailed illustration of FIG. 1 with a headrest support of the motor vehicle seat and the screen arranged in a mounting window of the headrest support.
Figure 3:
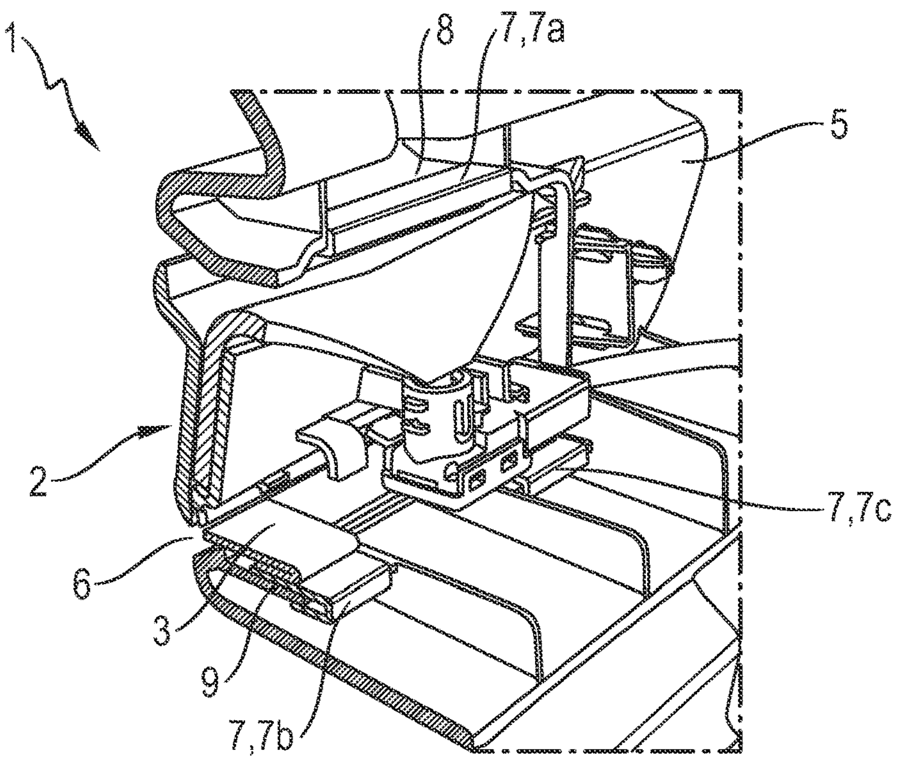
FIG. 3 is a sectional view through the motor vehicle seat of FIG. 1 in the region of the screen.
Figure 4:
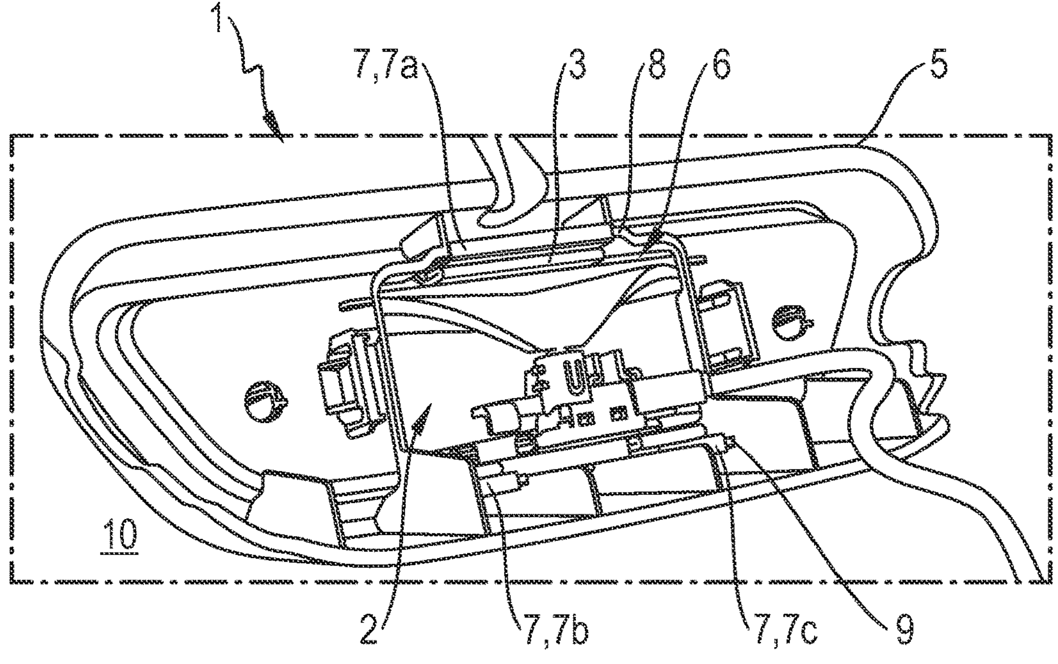
FIG. 4 is a rear view of the mounting window of the vehicle seat according to an embodiment of the invention having a cover suspended via hooks.

A motor vehicle seat 1 according to the invention is illustrated in FIGS. 1, 3 and 4 and comprises an illuminable screen 2 and a cover 3 made, for example, of leather or a covering material. The motor vehicle seat 1 comprises a headrest 4 with a headrest support 5. A mounting window 6 is provided on the headrest support 5, and the illuminable screen 2 can be inserted into the mounting window 6. For example, an individually adapted lettering, a logo, or other graphical elements can be shown through the illuminable screen 2.

Hooks 7 are sewn onto an edge of the cover 3 to fix the cover 3 reliably in the region of the mounting window 6, i.e. in the transition to the screen 2 (see FIGS. 3 and 4). The hooks 7 enable the cover 3 to be suspended on the headrest support 5.

The headrest support 5 has an upper edge 8 and a lower edge 9 on the mounting window 6 (see FIG. 3), and the cover 3 is connected to the upper and lower edges 8 and 9 of the headrest support 5 via the hooks 7.

FIGS. 3 and 4 show first, second and third hooks 7*a*, 7*b*, 7*c* sewn along the edge of the cover 3. The first hook 7*a* rearwardly engages with the upper edge 8 of the mounting window 6, while the second and third hooks element 7*b* and 7*c* rearwardly engage the lower edge 9 of the mounting window 6.

The hooks 7 can be made of plastic and can be sewn together with the edge of the cover 3. The edge of the cover 3 can also be bent in the region of the hooks 7 arranged thereon, as shown in FIG. 3, to provide a doubling via which tensile forces can be introduced into the cover 3 particularly well to avoid excessive strain on the cover 3.

The design of the hooks 7 and the mounting window 6 with the upper and lower edge 8, 9 is that the hooks 7 are obscured by the illuminable screen 2 inserted in the mounting window 6 and are thus no longer visible from the outside.

The motor vehicle seat 1 can be used in any motor vehicle 10, in particular in a sports car, an electric vehicle, or a hybrid vehicle.

The motor vehicle seat 1 provides a reliable fixation of the cover 3 in the region of a mounting window 6, i.e. a transitional region to an illuminable screen 2, by having the corresponding edges 8, 9 of the headrest support 5 rearwardly engage with the inserted hooks 7. In addition, an easy mounting is made possible.

The invention claimed is:

1. A motor vehicle seat, comprising:

a headrest support having a forwardly open mounting window defined partly by rearwardly facing upper and lower spaced apart edges, upper and lower hooks hooked respectively to the upper and lower edges and disposed so that a portion of each of the hooks is disposed in the mounting window, a cover sewn to surfaces of the hooks disposed in the mounting window, the cover extending forwardly from the hooks and out from the mounting window to cover outer parts of the headrest supports; and an illuminable screen arranged in the mounting window, the illuminable screen being disposed forward of the hooks and being disposed to obscure the hooks.

2. The motor vehicle seat of claim 1, wherein one of the hooks rearwardly engages the upper edge of the mounting window, and two of the hooks rearwardly engaging the lower edge of the mounting window.

3. The motor vehicle seat of claim 2, wherein the edge of the cover is bent and doubled at a region that is sewn to the hooks.

4. A motor vehicle, comprising:

a motor vehicle seat, the motor vehicle seat including:

a headrest support having a forwardly open mounting window defined partly by rearwardly facing upper and lower spaced apart edges, upper and lower hooks hooked respectively to the upper and lower edges and disposed so that a portion of each of the hooks is disposed in the mounting window:

a cover sewn to surfaces of the hooks disposed in the mounting window, the cover extending forwardly from the hooks and out from the mounting window to cover outer parts of the headrest supports; and an illuminable screen arranged in the mounting window, the illuminable screen being disposed forward of the hooks and being disposed to obscure the hooks.

* * * * *